United States Patent [19]

Decraemer

[11] Patent Number: 4,859,915
[45] Date of Patent: Aug. 22, 1989

[54] LINE DEFLECTION CIRCUIT WITH DYNAMIC S CORRECTION

[75] Inventor: Alain Decraemer, Garches, France

[73] Assignee: U.S. Philips Corporation, New York, N.Y.

[21] Appl. No.: 191,300

[22] Filed: May 6, 1988

Related U.S. Application Data

[63] Continuation of Ser. No. 89,096, Aug. 25, 1987, abandoned.

[30] Foreign Application Priority Data

Sep. 2, 1986 [FR] France ............................ 86 12319

[51] Int. Cl.$^4$ ............................................. H01J 29/56
[52] U.S. Cl. .................................. 315/371; 315/370; 315/1.0; 315/3.0
[58] Field of Search ............... 315/371, 370, 1.0, 3.0

[56] References Cited

U.S. PATENT DOCUMENTS

| | | | |
|---|---|---|---|
| 3,676,733 | 7/1972 | Eulenberg et al. | 315/27 GD |
| 3,895,258 | 7/1975 | Gruetman | 315/370 |
| 4,242,714 | 12/1980 | Yoshida et al. | 315/371 |
| 4,533,855 | 8/1985 | Willis et al. | 315/370 |
| 4,733,141 | 3/1988 | Watanuki | 315/371 |

*Primary Examiner*—Donald J. Yusko
*Assistant Examiner*—Brian S. Palladino
*Attorney, Agent, or Firm*—Edward W. Goodman

[57] ABSTRACT

In a line deflection circuit including an "S"0 correction capacitor in series with the deflection winding a second "S" capacitor is inserted in series with the first one, and there is impressed a sawtooth current at line frequency whose amplitude varies at field frequency by an auxiliary circuit similar to the main deflection circuit and of a source whose voltage varies parabolically with the field frequency. The supply circuit applies a d.c. voltage substantially without field modulation to the series arrangement formed by the two S capacitors.

3 Claims, 1 Drawing Sheet

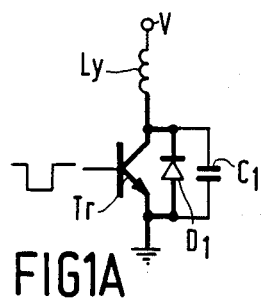
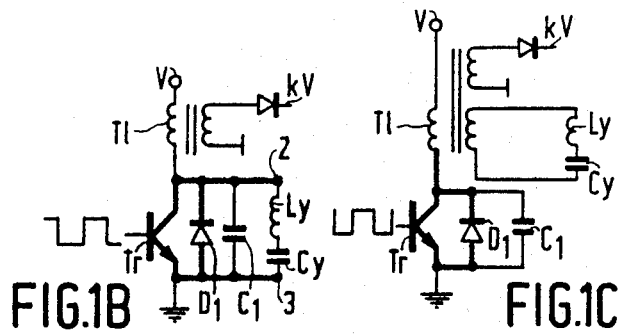
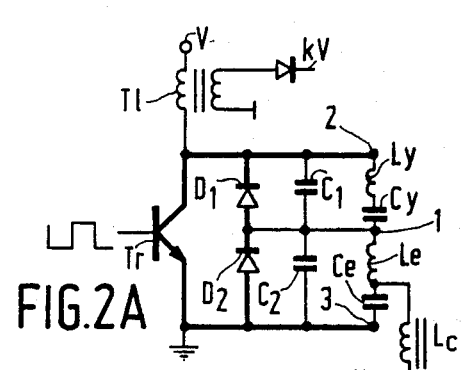
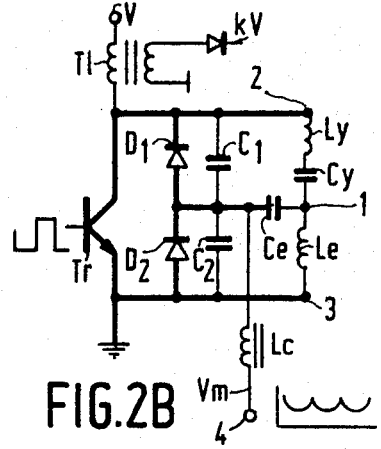
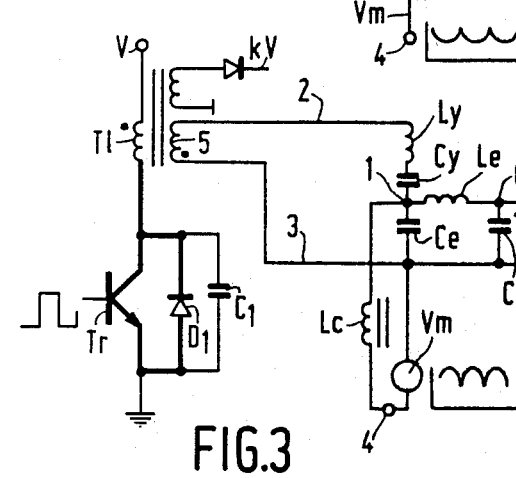
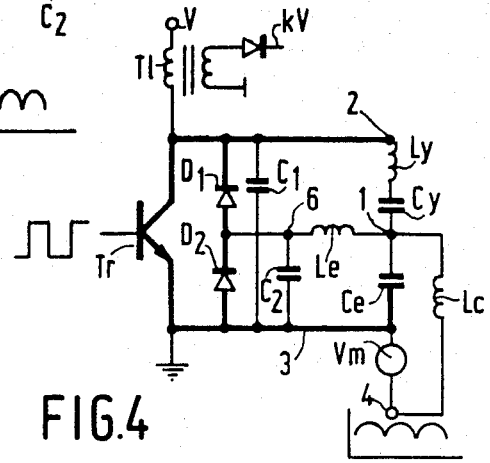

LINE DEFLECTION CIRCUIT WITH DYNAMIC S CORRECTION

This is a continuation of application Ser. No. 089,096 filed Aug. 25, 1987 now abandoned.

BACKGROUND OF THE INVENTION

The invention relates to a line deflection circuit for an image display tube with magnetic beam deflection, provided with a series arrangement including a deflection inductance, a first and a second S capacitor, switching means being conductive during a part of the line period called the trace time for applying to the series arrangement a substantially constant voltage and being cut off during the rest of the period called the retrace time during which the series arrangement forms, with a retrace capacitance, a resonant circuit, the circuit being provided with modulating means for causing to flow in the second S capacitor a sawtooth current at line frequency and of amplitude varying at field frequency, a portion of this current also flowing through the deflection inductance.

Because the angle between the deflected cathode beam and the screen of the tube varies during the scanning, it is necessary to correct the scanning speed as a function of the coordinates of the scanned point: this is the wellknown correction called "S correction" because it gives an "S" shape to the representation of the sawtooth current in the deflection inductance (the deflector). It is obtained by means of the abovementioned S capacitor which is in series with the deflector during the trace time, during which time a constant voltage is applied to the series deflector-capacitor group called here the LC group.

In this way, a tuned circuit has been produced introducing a sinusoidal component which distorts the main current and gives it an "S" shape.

The basic circuit als requires a certain number of corrections intended to correct the geometric imperfections of the cathode ray tube/deflector assembly. In particular, a known distortion called "pincushion" distortion requires a correction known as "East-West" which causes a dynamic horizontal amplitude variation during the field scanning.

Numerous circuits have been proposed for correcting pincushion distortion. The circuit most used at present is that called the "diode modulator", which is described among others in the French Pat. No. 2,216,722, and more recently in the document: "Philips electronic components and materials"—Technical publication number 201, entitled "Drive circuits for 45 AX". The problem solved by this circuit is to be able to dynamically vary the amplitude of the line deflection without varying the extrahigh tension ("EHT") which is derived, in most cases, from the line deflection stage. In this circuit, a second LC group is disposed in series with the first one and a variable voltage at field frequency is applied to the terminals of the capacitor of this second group. This circuit requires adaptations with the new flat, squarecornered tubes; in fact, these tubes demand a more pronounded "S" correction than the old tubes, and more dynamic, i.e. varying during a field, whereas they demand less pincushion correction than the old tubes. In the circuits of the quoted documents, the application of the variable voltage at field frequency essentially causes a variation in the deflection amplitude. A variant, described for example with FIGS. 3 to 5 of the last document quoted, enables the additional introduction of a dynamic "S" correction (also called: "inner pincushion distortion") associated with the amplitude correction.

The obtaining of a smaller amplitude variation is now required, associated with a greater variation in the "S" correction. A known means for obtaining this effect is to add a second "S" capacitor in parallel with the first and to switch this second capacitor by means of an electronic switching circuit which connects or disconnects this second capacitor according to a duty cycle which varies during a field. This second capacitor has little effect on the amplitude. Such a circuit is described in document EP-A-1,046,345, according to which a capacitor thus switched is added to a conventional diode modulator circuit.

This technique has the disadvantage of requiring an additional circuit for defining the times of switching the additional capacitor, whose connection time must also be rather finely chopped in order to avoid the introduction of distortions in a line: switching it just once during a line is not sufficient as this would introduce a visible distortion in the line linearity.

SUMMARY OF THE INVENTION

The invention proposes providing a particularly simple circuit which produces the desired correction without introducing any line distortion and without varying the "EHT". For this purpose, the circuit according to the invention is characterized in that the circuit is also provided with supply means for applying a d.c. voltage that is substantially free of any component at the field frequency to the series arrangement formed by the two S capacitors.

In a variant embodiment in which the modulator means includes an auxiliary inductance connected in series with a switching element, the switching element is advantageously connected to the second S capacitor by means of the auxiliary inductance.

In another variant embodiment, in which the switching means for applying a constant voltage during the trace time includes two diodes in series with the same direction of conduction and connected to the series arrangement formed by the deflection inductance and the two S capacitors, an auxiliary inductance is advantageously connected between the common point of these two capacitors and the common point of the two diodes.

This variant is particularly economical, as the main means for applying to the LC group a constant voltage during the trace time also serves to produce a sawtooth current in the auxiliary capacitor, only requiring the addition of a correctly placed auxiliary inductance.

BRIEF DESCRIPTION OF THE DRAWINGS

The following description with reference to the appended drawings describing nonlimiting examples, will give a good understanding of how the invention can be embodied.

FIGS. 1A to 1C and 2A to 2B illustrate different variants of circuits according to the prior art.

FIGS. 3 and 4 each show a variant of a circuit according to the invention.

DETAILED DESCRIPTION OF THE INVENTION

FIG. 1A is circuit diagram used in practically all the line deflection circuits in television receivers. It essentially includes a deflection inductance—or deflector Ly—connected between a voltage supply terminal referenced "V", and ground (i.e. the other terminal of the powder supply source) via an electronic switch here represented by a transistor Tr. When the transistor Tr is conducting, the constant voltage V is applied to the deflector Ly. This voltage remains applied during a part of the time called the trace time during which the current in the inductance Ly then varies linearly. When the transistor Tr is cut off at the end of this period, the time called the retrace time begins. The capacitor C1, connected in parallel with the transistor Tr then becomes active. It forms, with the inductance Ly, a resonant circuit by means of which, after about a half oscillation period, the current is reversed in the inductance Ly. The diode D1, connected in parallel with the transistor Tr then is active and its direction of conduction, opposite to that of the transistor, corresponds with the current in the inductance Ly at this instant. When the diode D1 becomes conducting, the constant voltage V is again applied to the deflector Ly, and a new trace time begins.

This fundamental circuit does not include any correction. In order to provide the "S" correction mentioned above, the voltage applied to the deflector Ly must be varied during the trace time. This may be produced by modulating the voltage V. In practice, a simple means is used consisting of introducing a capacitor in series with the deflector Ly, the group of these elements in series being hereafter called: "LC group". As the capacitor cuts the path of the direct current provided by the source V, one of the two diagrams shown in FIGS. 1B and 1C is used where the corresponding components bear the same references as in FIG. 1A.

In FIG. 1B, the LC group, (Ly, Cy) is supplied by the source V via a transformer T$\rho$ and this group is placed in parallel with the components Tr, C1, D1: considering that the capacitor Cy constitutes a voltage source, a diagram similar to that of FIG. 1A is found. Thus, a constant zero voltage (ignoring the saturation voltage of the transistor and the direct voltage drop across the diode) is applied to the terminals of the LC group during the trace period.

The variant in FIG. 1C is used when d.c. isolation is desired between the deflector Ly and the rest of the circuit. It corresponds to the circuit in FIG. 1A in which a transformer T$\rho$ would have been inserted for supplying the deflector Ly, and a capacitor Cy added in series with Ly.

The transformer T$\rho$ in practice includes at least one other winding denoted by the reference kV in the Figures, which, in particular, feeds the EHT rectifier necessary for accelerating the cathode beam.

The circuit in FIG. 3 is a circuit according to the invention in a first variant in which d.c. isolation is required between the control circuit and the deflector, obtained by means of the line transformer T$\rho$. This circuit uses the basic diagram shown in FIG. 1C and the components which have the same function in both Figures bear the same references. In the diagram of FIG. 3, a second capacitor Ce is inserted in the LC group in series with the first capacitor Cy and at the common point (1) of the two capacitors there is injected a sawtooth current at line frequency whose amplitude varies at field frequency. This current is obtained by placing in parallel with the capacitor Ce a circuit constituted from an inductance Le in series with a switching system constituted by a switching transistor Ta, in parallel with a capacitor C2 and a diode D2 whose direction of conduction is opposite to that of the transistor. In parallel with the capacitor Ce there is also placed a circuit constituted by a choke Lc, in series with a voltage source Vm which varies at field frequency. The average charge voltage of the capacitor Ce is therefore equal to $V_m$. As the transistor Ta is controlled by signals at line frequency, the set of components Le, D2, C2, Ta, function in the same way as the set of components Ly, D1, C1, Tr, respectively, of FIG. 1A, i.e., a sawtooth current is produced in the inductance Le, a current whose amplitude depends on $V_m$. In addition, the tuned circuit constituted by the components Le and C2 must resonate at substantially the same frequency as the resonant circuit constituted by the components Ly and C1 via the transformer T$\rho$. The average voltage at the terminals of the capacitor Ce therefore varies with $V_m$ during a field, but this has, in the first instance, no effect on the amplitude of the current in the deflector $L_y$ as the series arrangement of the two capacitors Cy+Ce is always short-circuited from the point of view of the direct current via the inductance Ly and the secondary winding of T$\rho$, and is therefore, charged to an average zero voltage (the capacitor Cy is therefore charged to a variable average voltage equal and opposite to that of the capacitor Ce). A constant voltage is applied, during the trace period, by the winding 5 of the transformer T$\rho$ to the Ly, Cy, Ce group. On the other hand, the sawtooth current in the inductance Le causes, at the terminals of the capacitor Ce, a voltage of parabolic shape corresponding with the integral of the currents which pass through it and which is known to provide an "S" correction. This voltage has the shape of parabolic arches each of which lasts for one line duration and provide an "S" correction, and must not be confused with the voltage parabolas Vm, which last for the duration of a field and possibly provide the pincushion correction and/or the variation of the effectiveness of the "S" correction. It is noted that the current passing through the capacitor Ce has a constant amplitude component, provided by the current of the deflector which provides a certain fixed "S" correction, and an amplitude component which is variable during a field, provided by the current in the auxiliary inductance Le, which therefore provides a variable "S" correction during a field.

Another variant of the circuit according to the invention is shown in FIG. 4. This variant corresponds with the basic known drawing of FIG. 1B. With respect to the known circuit diagram, a second capacitor Ce is inserted in series with the Ly/Cy group, the diode D1 is replaced by two diodes D1, D2 in series, and an auxiliary inductance Le is connected between the common point of the two capacitors Cy, Ce and the common point of the two diodes D1, D2, and finally a second retrace capacitor C2 is placed in parallel with the diode D2. The capacitor C1 is still in parallel with the transistor Tr. The two tuned circuits Ly, C1 and Le, C2 are designed to have substantially the same period. This variant is based on the same variable "S" correction principle as that of FIG. 3, but the function of the auxiliary transistor Ta of FIG. 3 is here performed by the main transistor Tr itself.

The diagram in FIG. 4 can recall that of the diode modulator of the prior art shown in FIGS. 2A and 2B. It is therefore useful to revert to these known circuits in order to show how the new circuit differs in its principle and in its effects.

When it is a matter of modulating at field frequency the amplitude of the deflection, i.e. the amplitude of the current in the deflector, in order to correct the pincushion distortion mentioned above, it would be imaginable to modulate the supply voltage V. But this process would involve an accompanying variation of the voltage at the terminals of the winding Tp and therefore of all the voltages that it also supplies: one solution is provided by the known circuit shown in FIG. 2A, called the "diode modulator". This circuit includes the components of FIG. 1B with the same references, but in series with the assembly of the three components D1, C1, Ly/Cy, there is placed another of the same construction also including three corresponding components D2, C2, Le/Ce, respectively. In addition, a choke Lc connects the common point of the components Le and Ce to a terminal 4 of a voltage source. During the trace period, a constant voltage (substantially zero) is applied to the terminals of the group Ly/Cy either through transistor Tr in series with the diode D2, or through the diode D1 depending on the direction of current in the group Ly/Cy. Similarly, a substantially zero voltage is applied to the second group Le/Ce, either through D1 and Tr, or through D2. The connections which are thus substantially short-circuited during the trace time are indicated by thick lines in the Figures.

Considering the circuit from the direct current point of view, the transistor being cut off, it is noted that the two capacitors Ce+Cy in series are in total charged on average to the voltage V. When a voltage Vm is applied to the terminal 4, the charge voltage of the capacitor Ce is equal to Vm, and that of capacitor Cy is then V−Vm. The voltage at the terminals of the latter then has the function of a supply voltage, the result being that this voltage reduces as Vm increases and that the deflection amplitude reduces; but the voltage at the terminals of Tp, which is the sum of that of the two groups in series, remains constant. The "S" correction substantially does not vary (the group Ly/Cy being short-circuited by the path shown in thick lines, only Cy being active for the S effect).

With the diagram of FIG. 2B, an improvement is obtained in the sense that the "S" correction varies with the deflection amplitude. In fact, from the direct current point of view, the capacitor Cy is always charged to an average value V and capacitor Ce is charged to the value Vm. (With the diagrams shown in FIGS. 2 to 4, Vm must always be positive, and if not it would be short-circuited by the diode D2). When, during the trace period, the semiconductor components Tr, D1, D2 substantially short-circuit all the connections shown in the thick line in the Figure, the capacitors Ce and Cy find themselves in series, but they are charged in opposite directions, and therefore a voltage V−Vm is applied to the deflector Ly, as in the case of FIG. 2A, and therefore produces the same current in the deflector Ly, with the same relation between Vm and the deflection amplitude. The inductance Le here receives at its terminals a voltage Vm, but now, the the capacitor Ce is passed through by the difference in the currents of the inductance Ly and inductance Le. In order to increase the line amplitude, it is necessary to reduce Vm in the middle of the field deflection: which explains the direction of the parabolas shown to the side of point 4. By reducing Vm, the current in the inductance Le is reduced and as this is subtracted from that of the inductance Ly in the capacitor Ce, the current in the latter is therefore increased in the middle of a field: this accentuates the "S" correction as required. However, it is not possible to achieve high dynamic "S" correction values with low values of amplitude correction as the two corrections are linked. In addition, this circuit has a disadvantage in that the current in the inductance Le can temporarily exceed that in the inductance Ly, which gives rise to the cutting off of the diode D2, if this happens at first during the trace period when the transistor is not yet conducting. The document quoted above entitled "Drive circuit for 45 AX" indicates means for overcoming this disadvantage, but they give rise to a complication of the circuit.

In the circuit diagram according to the invention (FIG. 4) the two capacitors Cy and Ce are charged in series to the average voltage V—as in the known circuit in FIG. 2A—, but, during the trace period, the circuit in thick line short-circuits the assembly of the block Ly, Cy, Ce and therefore the deflector is "fed" by the capacitors Cy+Ce in series, whose total charge is always equal to V. The amplitude does not therefore in the first instance vary with Vm. The charge voltage of capacitor Ce, on average equal to Vm, is applied during the trace period to the inductance Le, and there causes to flow a sawtooth current proportional to Vm; this current being added to that of the inductance Ly in the capacitor Ce increases the "S" correction whose effectiveness therefore directly depends on Vm. There is therefore an essential difference as regards the effect produced by the circuit according to the invention compared with diode modulators: the "S" correction is adjustable at will by Vm whereas, in principle, there is no pincushion correction.

In addition, the current passing through diode D2 of the circuit according to FIG. 4, is the current in the inductance Le, whereas, in the known circuit of FIG. 2B, the current in the diode D2 is that of the inductance Ly less that of the inductance Le. The disadvantage of the known circuit mentioned above, due to the possible cutting off of the diode D2, does not therefore exist in the circuit of the invention.

The essential difference between the mode of action of the circuit of the prior art and that of the circuit of the invention is also shown up by the fact that the parabolic voltage variation at field frequency of Vm is in the opposite direction between FIGS. 2A and 2B on the one hand (prior art), and FIGS. 3 and 4 on the other hand (invention). In the circuits according to the invention, an increase in Vm during the field increases the "S" effect and is therefore necessary in the middle of the field deflection. In principle, there is no line amplitude variation, however is Vm if increased, the current increases in components Le and Ce, and the amplitude of the voltage parabola at line frequency induced at the terminals of the capacitor Ce by the sawtooth line current also increases. It can be shown that the effect of this is to very slightly increase the average voltage at the terminals of the capacitor Ce, calculated during the trace time alone. This results in a very slight increase in the deflection amplitude, which is a secondary effect of the "S" correction and completely distinct from the amplitude variations due to a voltage difference by subtraction of Vm from V in the case of FIGS. 2A, 2B. It is with reference to this secondary effect that an absence "in the first instance" of amplitude variation was mentioned several times above. It is therefore possible to obtain, using the circuit according to the invention, a slight pincushion correction, and a strong and adjustable "S" correction.

The values of components having given good results are as follows in the case of FIG. 4:

| C1 = 9.1 nF | Le = 1.2 mH | Ce = 0.54 μF |
| C2 = 130 nF | Ly = 1.9 mH | Cy = 1.2 μF | the supply voltage being 140 V and the voltage Vm having parabolic arches of amplitude approximately 50 V.

In order to simplify the Figure, a linearity corrector which is placed in series with the deflector Ly has not been shown. This corrector is shown in FIGS. 4 and 5 of the document quoted entitled "Drive circuits for 45 AX", which also provides a diagram of the embodiment of the generator Vm, which a person skilled in the art will easily be able to adapt in order to obtain the required amplitude and polarity.

Other variants of the circuit are possible without leaving the scope of the invention. For example, the capacitor C1 of FIG. 4 can be connected in parallel with the diode D1 on condition that it is given an appropriate different value; the transistor Tr can be replaced by any other switching component, for example a thyristor associated with its known cut-off system; the polarities of the semiconductors and of the power supply can be reversed. In addition it was mentioned above that the choke Lc is "connected" to the auxiliary capacitor Ce: any direct current link which enables the imposition at the terminals of the capacitor Ce of an average voltage equal to $V_m$ would suit. In other words, the said link is not mandatorily direct: in particular the inductance Lc can be connected to point 6 of FIGS. 3 and 4, instead of point 1. It is thus still "connected" in direct current to the capacitor Ce, via the inductance Le.

I claim:

1. A line deflection circuit for an image display tube with magnetic beam deflection, comprising a series arrangement includes a deflection inductance, a first and a second S capacitor, switching means conducting during part of the line period called the trace time for applying to the series arrangement a substantially constant voltage and being cut off during the rest of the period called the retrace time during which the said series arrangement forms with a retrace capacitance a resonant circuit, the circuit comprising modulating means for charging the second S capacitor at a voltage whose mean value is modulated at field frequency, characterized in that the first and second S capacitors have a common terminal that is connected via an auxiliary inductance to switching means conductive during the trace time, and that the series arrangement of the deflection inductance and the first and second S capacitors is permanently connected across a d.c. supply source.

2. A deflection circuit according to claim 1, in which the modulating means comprises said auxiliary inductance connected in series with a switching element, said switching element being controlled by a signal at line frequency, characterized in that the switching element is coupled to the second S capacitor by means of the auxiliary inductance.

3. A deflection circuit according to claim 1, in which the switching means for applying a constant voltage during the trace time comprises two diodes in series with the same direction of conduction and coupled to the series arrangement formed by the deflection inductance and the two S capacitors, characterized in that an auxiliary inductance is coupled between the common point of these two capacitors and the common point of the two diodes.

* * * * *